United States Patent [19]

Stelling

[11] Patent Number: 4,970,510
[45] Date of Patent: Nov. 13, 1990

[54] SELF TEST AVIONICS EQUIPMENT

[75] Inventor: Desi D. Stelling, Phoenix, Ariz.

[73] Assignee: Honeywell Inc., Minneapolis, Minn.

[21] Appl. No.: 453,731

[22] Filed: Dec. 20, 1989

[51] Int. Cl.⁵ ............................................. G06F 15/20
[52] U.S. Cl. .................................... 340/945; 340/514;
364/424.03; 455/67
[58] Field of Search ....................... 340/945, 961, 514;
364/424.03, 424.06; 455/67, 226

[56] References Cited

U.S. PATENT DOCUMENTS

| | | | |
|---|---|---|---|
| 4,155,116 | 5/1979 | Tawfik et al. | 364/424.03 |
| 4,245,352 | 1/1981 | Karpowycz et al. | 455/226 |
| 4,361,904 | 11/1982 | Matsumura | 455/67 |
| 4,788,531 | 11/1988 | Corwin et al. | 340/945 |

Primary Examiner—Joseph A. Orsino
Assistant Examiner—Brent A. Swarthout
Attorney, Agent, or Firm—Howard Paul Terry

[57] ABSTRACT

A self test avionics equipment is provided for use on an aircraft as part of a traffic collision avoidance system. The equipment has a radio frequency (RF) section and an integral test system. The RF section has an input-/output unit, a transmitter and a receiver. The input-/output unit has a local oscillator with a directional coupler, a two-way divider connected to the coupler, and an attenuator connected through a modulator to the coupler. The mixer and two-way divider each have an output coupling connector. The attenuator has an output pin switch connector. The transmitter has a modulator/amplifier portion, a spectrum filter connected to the modulator/amplifier portion, and a harmonic filter connected to the spectral filter. The harmonic filter has an ouput coupling connector. The test system comprises three dirctional coupler circuits and a pin switch circuit. The three directional coupler circuits are respectively coupled to the three output coupling connectors, respectively from the mixer, the two-way divider and the harmonic filter. A pin switch circuit connects to the pin switch connector.

4 Claims, 8 Drawing Sheets

SELF TEST AVIONICS EQUIPMENT

The invention relates to self test RF related avionics equipment, and in particular the invention relates to self test RF related avionics equipment having an integral test system with a plurality of directional coupler circuits.

BACKGROUND OF THE INVENTION

The prior art avionics equipment was tested using separate test equipment. Required tests are documented in Federal Aviation Regulations, Part 43, Section 91.172, Appendix F. Briefly, these tests include: (1) Transmitter Frequency (2) Suppression (3) Receiver Sensitivity (4) Transmitter Peak Power and (5) Diversity.

One problem with the prior art avionics equipment and test equipment is that it may require the removal of antennas from the aircraft, which may induce failures and which is also time consuming.

SUMMARY OF THE INVENTION

According to the present invention, self test avionics equipment havintg a radio frequency section and a test system is provided. This avionics equipment comprises a radio frequency section having an input/output unit and a transmitter unit and receiver unit both connected to the input/output unit, said input/output unit having a switch matrix component and having a built-in self test component and having an antenna coupler component connected to the switch matrix component and having a master oscillator, said transmitter unit having modulator amplifier means connected through the self test component to the master oscillator and having a spectrum filter connected to the modulator amplifier means and having a harmonic filter connected to the spectrum filter, said harmonic filter having an output coupling connector connected to the switch matrix componenet, said self test component having a directional coupler with an input connector connected to the master oscillator and having a two-way divider with an input connector connected to a first output terminal of the directional coupler and having a modulator with an input connector connected to a second output terminal of the directional coupler, said two-way divider having an output coupling connector connected to the receiver unit, the self test component having a mixer connected to the modulator through an attenuator by a connector from the attenuator and with an output coupling connector connected to the antenna coupler component, and this equipment comprises a test system having a first directional coupler circuit coupled to the coupling connector from the mixer and having a second directional coupler circuit coupled to the coupling connector from the two-way divider and having a third directional coupler circuit coupled to the coupling connector from the harmonic filter and having a pin switch circuit connected to the pin switch connector from the modulator.

By using the test system having the first and second and third directional coupler circuits and having the pin switch circuit, the problem of removal of antennas from the aircraft is avoided.

The foregoing and other, objects, features and advantages will be apparent from the following description of the preferred embodiment of the invention as illustrated in the accompanying drawings.

DESCRIPTION OF THE PREFERRED EMBODIMENT

As shown in FIG. 1, 2, 2A, and 2B assembly 10 is provided. Assemly 10 is an avionics equipment, or an avionics system, or a traffic collision avoidance system (TCAS), or a system computer unit. Assembly 10 includes a radio frequency (RF) section 14 and a test system 16.

Figures 1, 2:
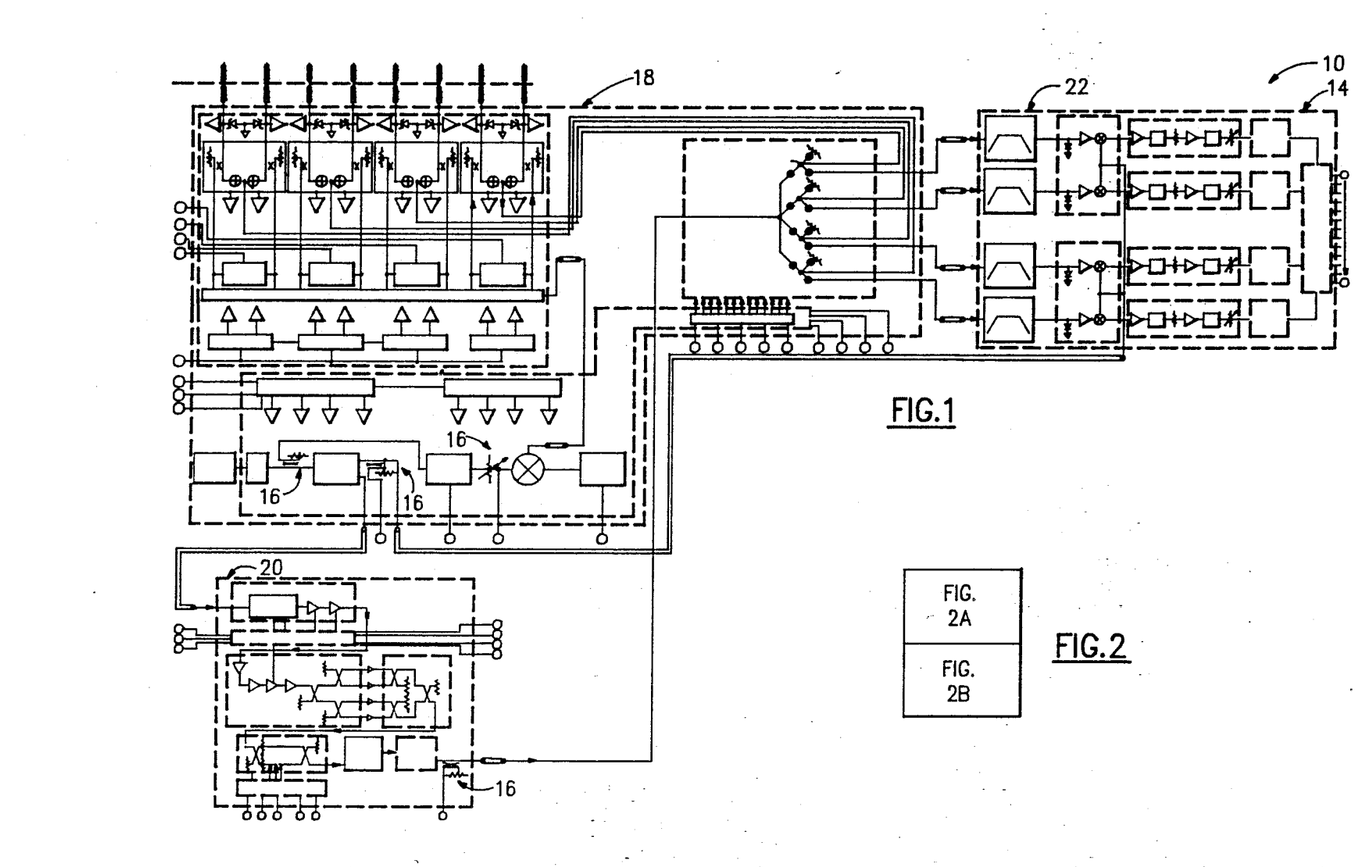
FIG. 1 is a block diagram of a radio frequency section of self test avionics equipment according to the invention.
FIG. 2 is a key diagram and FIGS. 2A and 2B are enlarged block diagrams of a first portion of FIG. 1.
Figure 2A:
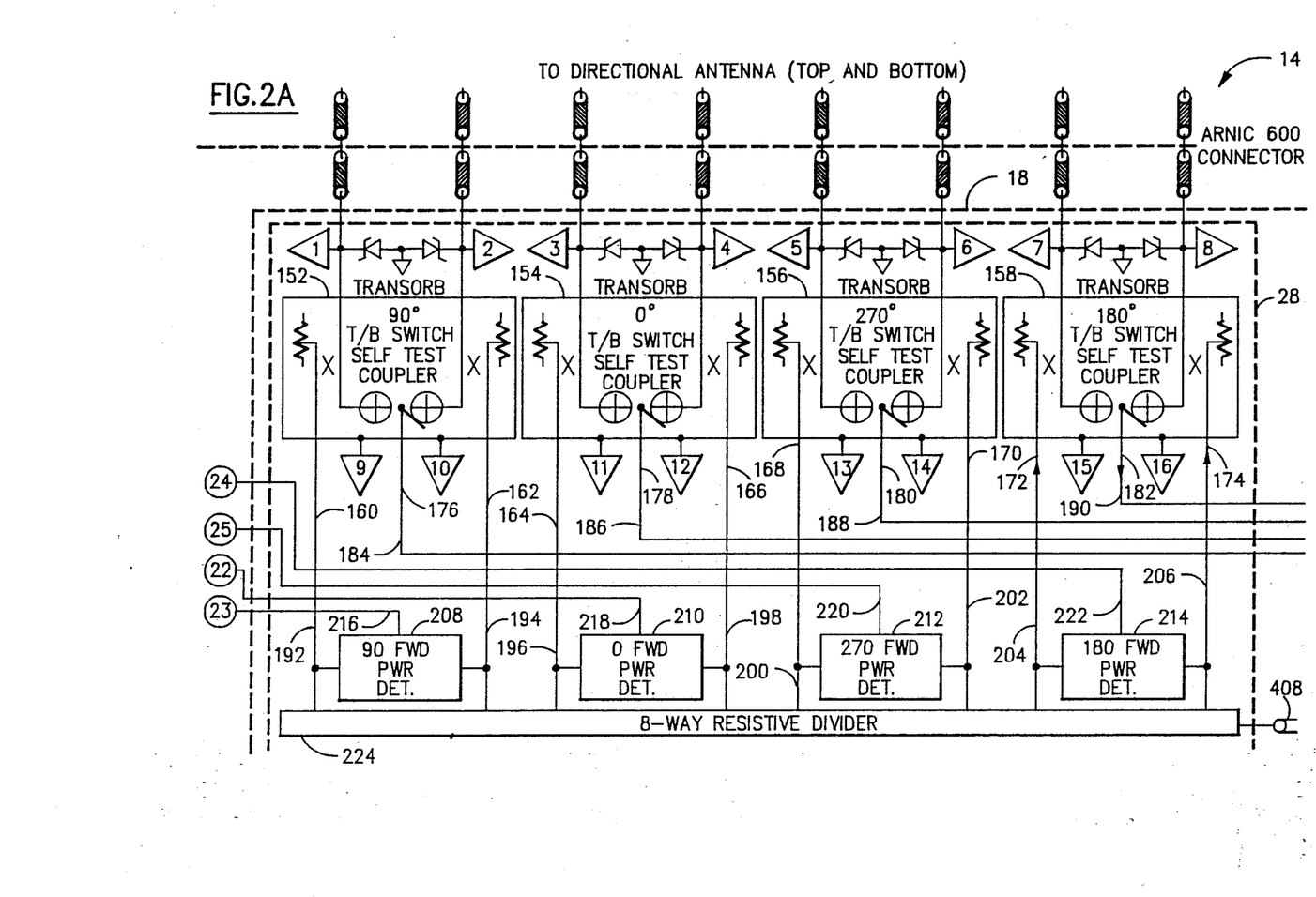
Figure 2B:
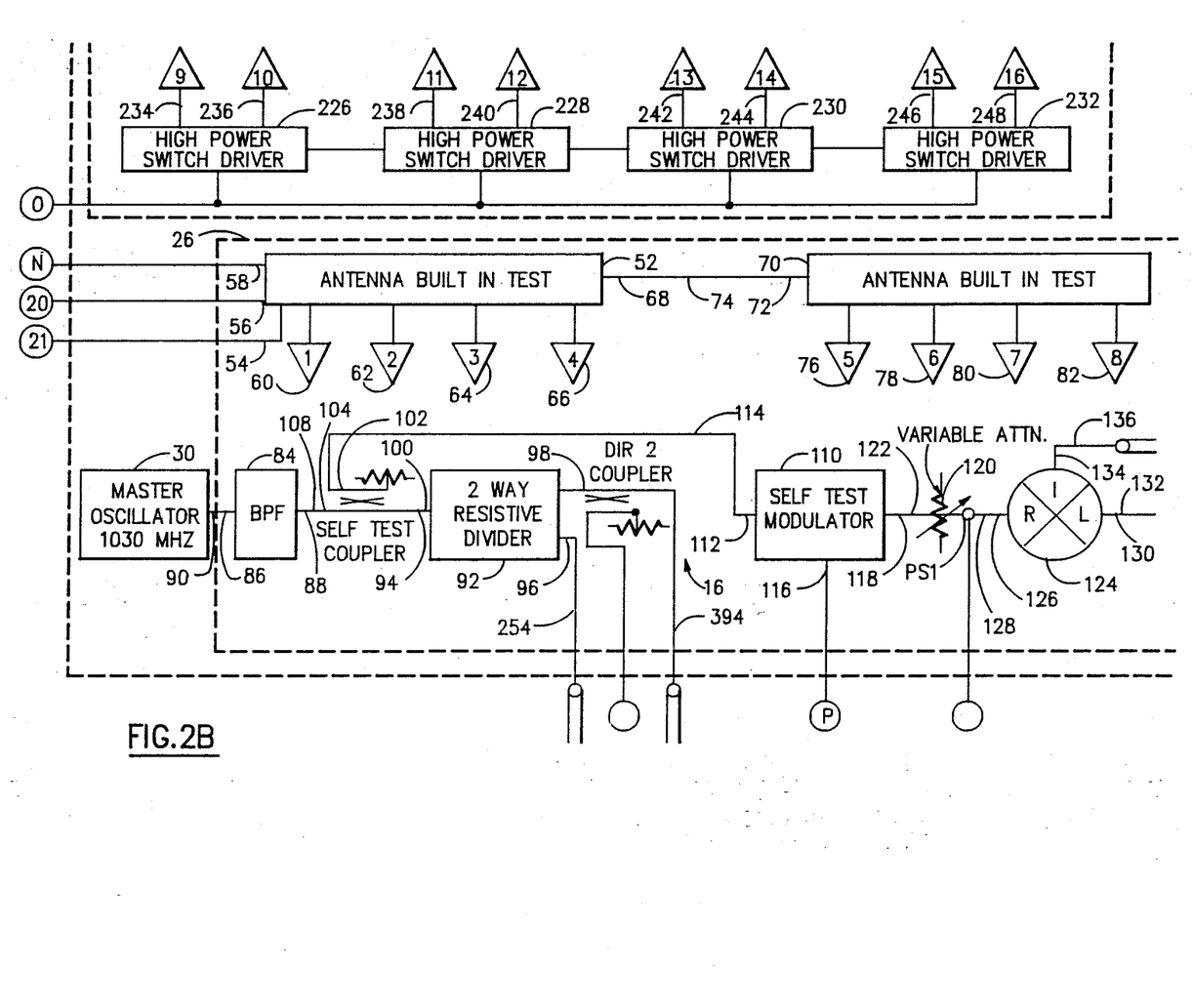

The RF section 14 has an input/output unit or I/O unit 18, a transmitter unit 20, and a receiver unit 22.

As shown in FIGS. 2, 2A, 2B, and 3, input/output unit 18 includes a switch matrix component 24, a built-in self test (BITE) component 26, an antenna coupler component 28, and a master oscillator 30.

Switch matrix component 24 has four switches 32, 34, 36, 38 which respectively have four pin diode terminals 40, 42, 44, 46 that connect to receiver 22. Component 24 has a terminal 48 which connects to transmitter 20. Component 20 also has a thirteen-terminal input array 50, which connect to component 26.

As shown in FIGS. 2, 2A, 2B, and 3, BITE component 26 has a first antenna built-in test unit 52, which has three end output terminals 54, 56, 58. Component 26 has one side input terminal 60, three side output terminals 62, 64, 66 and a connector terminal 68. Component 26 has a second antenna built-in test unit 70, which has a terminal 72 that has a connector 74 connected to terminal 68. Test unit 70 also has four side output terminals 76, 78, 80, 82.

As shown in FIGS. 2, 2A, 2B, and 3, component 26 has a BPF (Band Pass Filter) part 84 which has an input terminal 86 and an output terminal 88. Terminal 86 has a connector 90 which connects to master oscillator 30. Component 26 also has a two-way divider 92, which has an input terminal 94, a first output terminal 96, and a second output terminal 98. Input terminal 94 has a connector 100. Connector 100 connects to a coupler 102 at its output terminal 104. Coupler 102 has an input terminal 106 with a connector 108.

Component 26 also has a self test modulator 110, which has an input terminal 112 that has a connector 114 that connects to terminal 104. Modulator 110 has a side input terminal 116 and an output terminal 118. Modulator 110 also has a variable attenuator 120, which has an input connector 122 connected to terminal 118.

Component 26 also has a mixer 124, which has a first terminal 126 with a connector 128 connected to attenuator 120, and a second terminal 130 with a connector 132, and a third terminal 134 with a connector 136 connected to component 28.

Component 26 also has a self test 60 MHZ oscillator 138, which has an input terminal 140 and which has an output terminal 142 connected to mixer 124.

Figure 3:
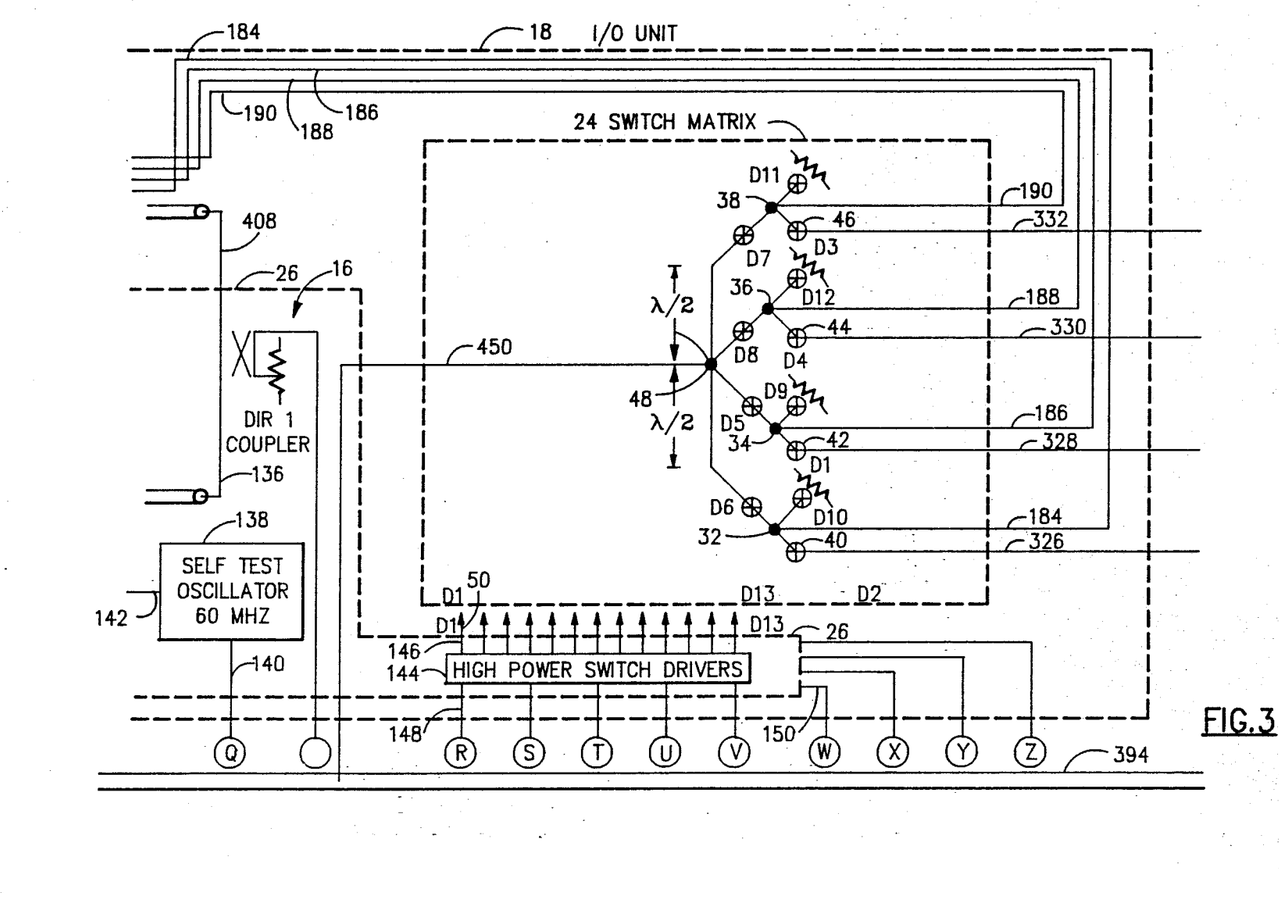
FIG. 3 is an enlarged block diagram of a second portion of FIG. 1.

As shown in FIG. 3, component 26 also has a high power switch drivers part 144, which has a thirteen-terminal output array 146 that is connected to array 50, a five-terminal side input array 148, and a four-terminal end input array 150.

As shown in FIGS. 2, 2A, 2B, and 3, antenna coupler component 28 has four T/B (Top/Bottom) switch self test couplers 152, 154, 156, 158 which respectively have pairs of input terminals 160, 162 and 164, 166, and 168, 170 and 172, 174. Couplers 152, 154, 156, 158 have respective output terminals 176, 178, 180, 182 which have respective connectors 184, 186, 188, 190, which connect to respective switches 32, 34, 36, 38. Couplers 152, 154, 156, 158 have respective pairs of connectors 192, 194, and 196, 198, and 200, 202, and 204, 206.

Component 28 also has four forward power detectors 208, 210, 212, 214, which respectively connect at each end to connectors 192, 194, 196, 198, 200, 202, 204, 206. Power detectors 208, 210, 212, 214 have four respective output connectors 216, 218, 220, 222 for exterior connections.

Components 28 also has an eight-way resistive divider 224, which connects to connectors 192, 194, 196, 198, 200, 202, 204, 206.

Component 28 also has four high power switch drivers 226, 228, 230, 232, which have four respective pairs of output terminals 234 and 236, 238 and 240, 242 and 244, 246 and 248, that connect to couplers 152, 154, 156, 158.

Figure 4:
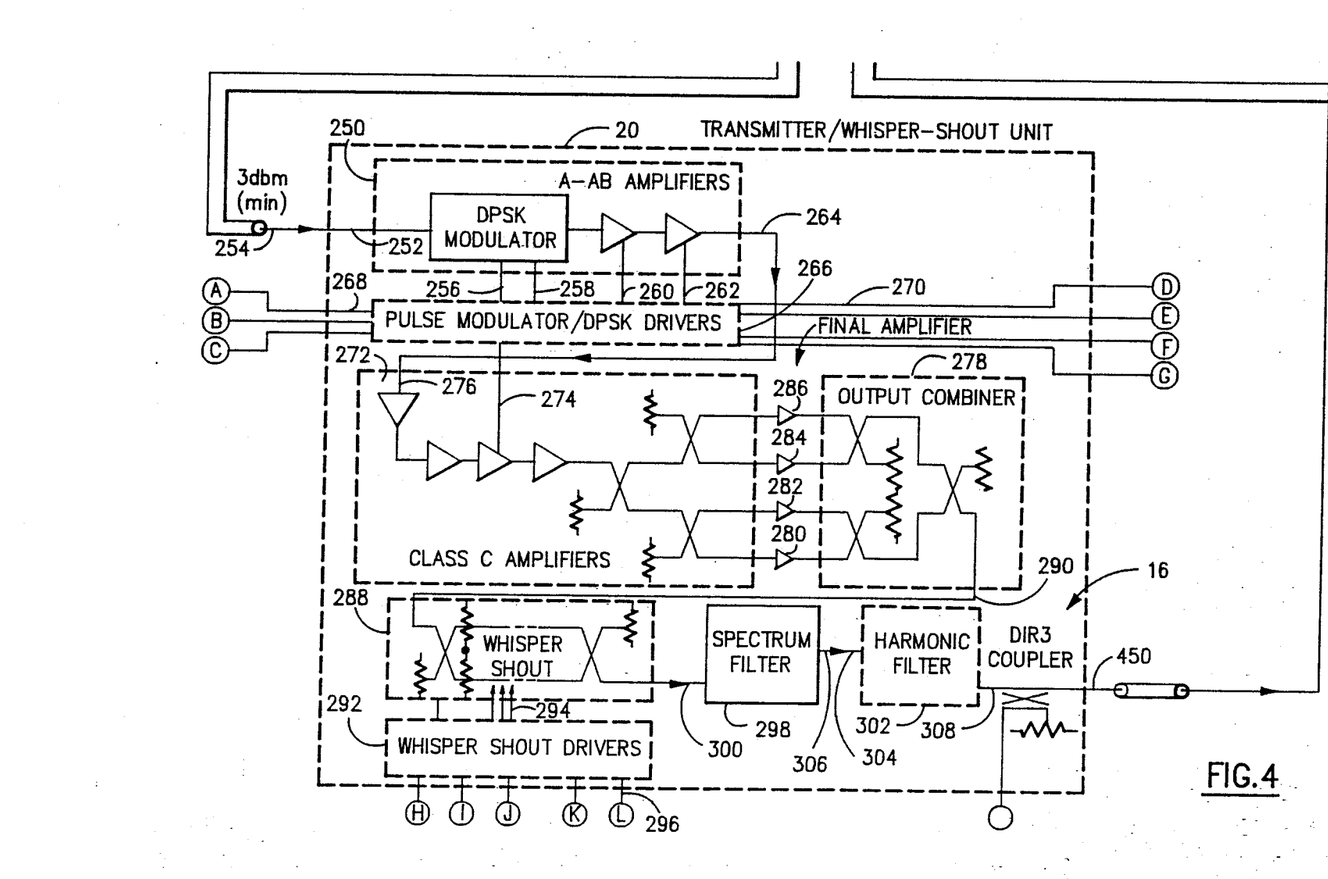
FIG. 4 is an enlarged block diagram of a third portion of FIG. 1.

As shown in FIG. 4, transmitter unit 20 has a first modulator/amplifiers component 250, which has a first input terminal 252, that has a connector 254 connected to terminal 96. Component 250 has four side terminals 256, 258, 260, 262 and one end terminal 264.

Transmitter 20 has a second pulse modulator/drivers component 266 which connects to terminals 256, 258, 260, 262. Component 266 has a three-terminal array 268 and a four-terminal array 270.

Transmitter 20 has a third class C amplifiers component 272, which has a connector 274 to component 266, and which has a connector 276 to terminal 264.

Transmitter 20 has a fourth output combiner component 278, which is connected through four final amplifiers 280, 282, 284, 286 to component 272.

Transmitter 20 has a fifth whisper-shout component 288, which has a connector 290 that is connected to component 278.

Transmitter 20 also has a sixth whisper-shout drivers component 292, which has a three-connector array 294 that is connected to component 288, and which has a five-connector array 296 for exterior connections.

Transmitter 20 also has a seventh spectrum filter (FIL 1) component 298, which has an input connector 300 that is connected to component 288.

Transmitter 20 has an eight harmonic filter (FIL 2) component 302, which has an input terminal 304 that has a connector 306 connected to component 298. Harmonic filter 302 has an output terminal 308, as explained hereafter.

Figure 5:
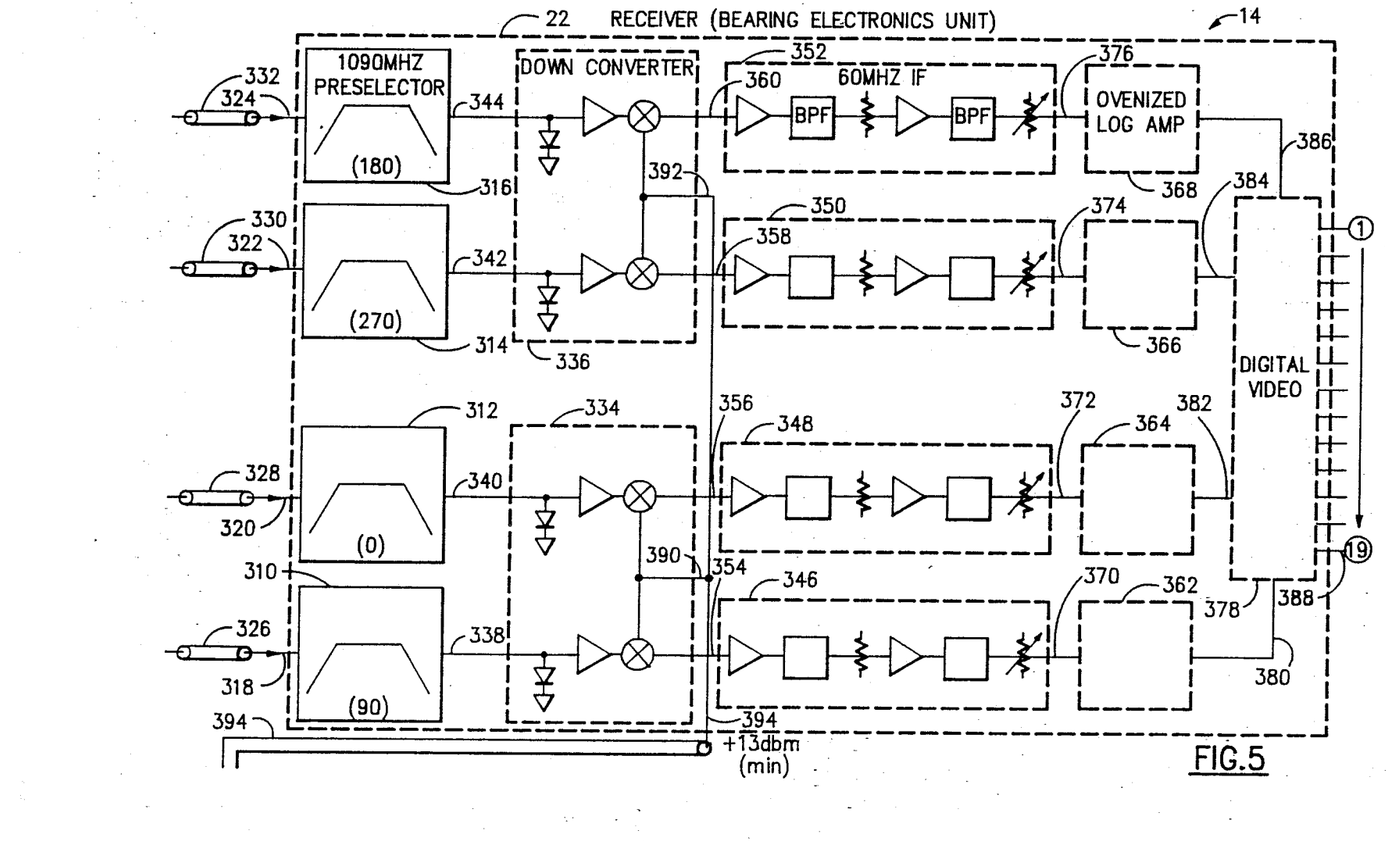
FIG. 5 is an enlarged block diagram of a fourth portion of FIG. 1.

As shown in FIG. 5, receiver unit 22 has four preselector components 310, 312, 314, 316, which have respective input terminals 318, 320, 322, 324, that haved respective connectors 326, 328, 330, 332, connected to respective terminals 40, 42, 44, 46.

Receiver 22 has two down converter components 334, 336, which have respective pairs of connectors 338, 340, 342, 344.

Receiver 22 has four 60MHZ IF components 346, 348, 350, 352, which have respective connectors 354, 356, 358, 360, connected in pairs to components 334, 336.

Receiver 22 has four ovenized log amplifier components 362, 364, 366, 368, which have respective connectors 370, 372, 374, 376 to respective components 346, 348, 350, 352.

Receiver 22 also has one digital video component 378, which has four connectors 380, 382, 384, 386 to respective components 362, 364, 366, 368. Component 378 has a nineteen-terminal array 388.

Components 334, 336 also have respective terminals 390, 392, which connect to a connector 394, that is connected to component 26 of unit 18.

Figure 6:
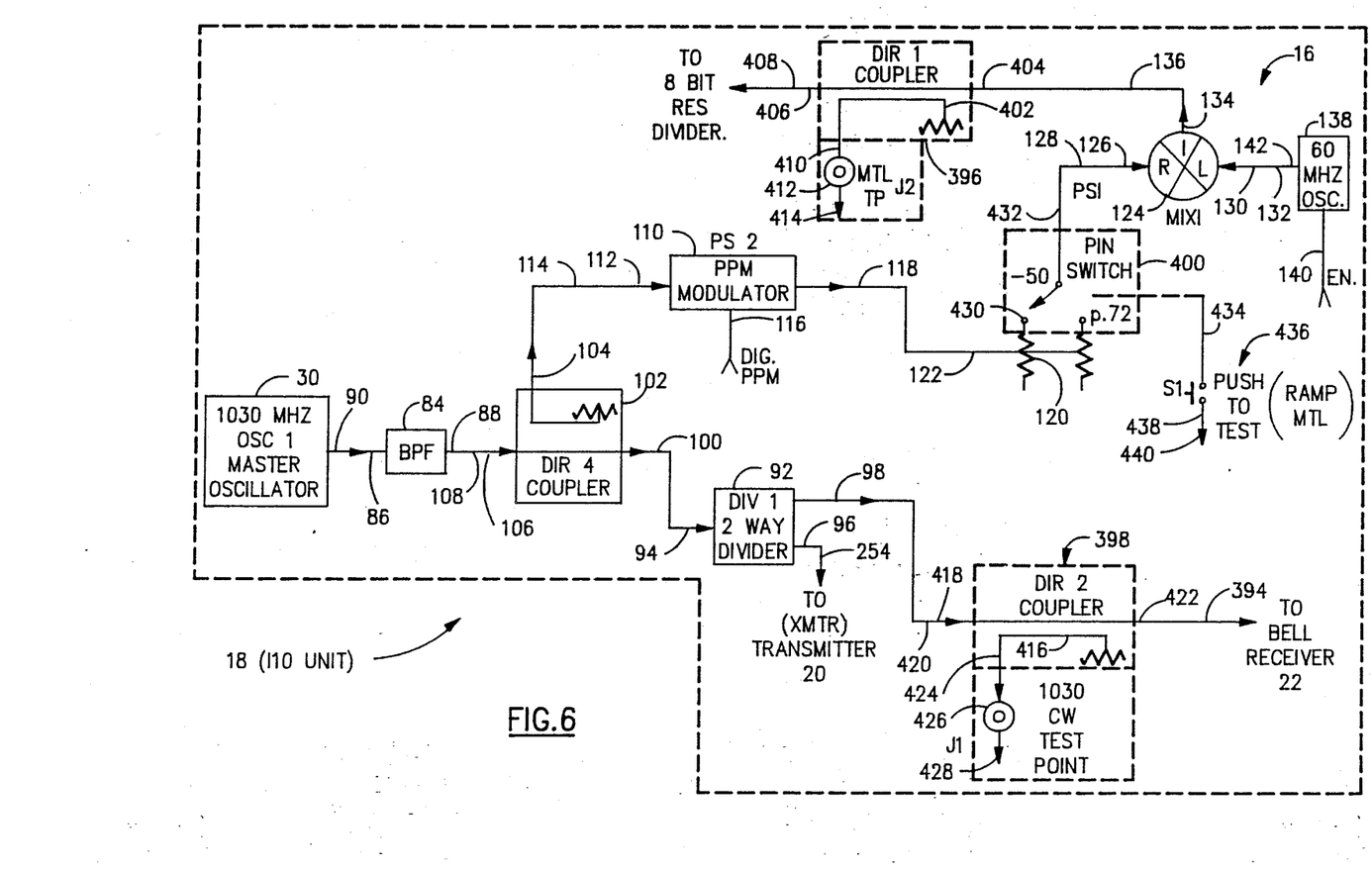
FIG. 6 is a schematic diagram of a portion of FIG. 1.

As shown in FIG. 6, test system 16 has a directional (DIR 1) coupler circuit 396, as shown in dotted lines in the Figure, and has a directional (DIR 2) coupler circuit 398, and has a pin switch (PS 1) circuit 400.

Circuit 396 has a coupler 402, which has an input terminal 404 that is connected to connector 136, and which has an output terminal 406 that is connected to a connector 408. Circuit 396 also has a connector 410, which is connected to a J2 test point 412, that has a ground 414.

Circuit 398 has a coupler 416, and has an input terminal 418 that is connected to connector 420 from terminal 98. Circuit 398 has an output terminal 422, which is connected to connector 394 to receiver 22. Circuit 398 has a connector 424 which is connected to a J1 test point 426 that has a ground 428.

Circuit 400 has an input terminal 430, which is connected to attenuator 120. Circuit 400 has an output terminal 432, which is connected to connector 128. Circuit 400 has a connector 434 which is connected to a push to test (RAMP MTL) switch 436. Switch 436 has a connector 438 to ground 440.

Figure 7:
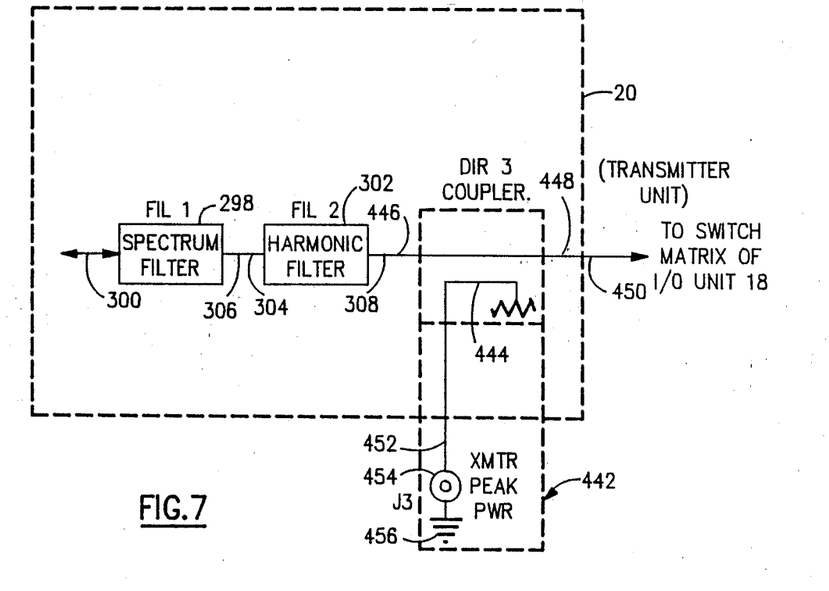
FIG. 7 is a schematic diagram of another portion of FIG. 1.

As shown in FIG. 7, test system 16 has a directional (DIR 3) coupler circuit 442, which has a coupler 444. Circuit 442 has an input terminal 446 which is connected to connector 308. Circuit 442 has an output terminal 448, which is connected to a connector 450 to input/output unit 18. Circuit 442 has a connnector 452, which is connected to a J3 test point 454, that has a ground 456.

Circuits 396, 398, 400, in FIG. 6, permit performance of a self test at an actual Receiver Minimum Treshold Level (MTL) specification such as about −72 dBm, and permit verification of actual power level, and allow measurement of TCAS computer RF local oscillator 30.

Circuit 442, in FIG. 7, permits easy measurement of transmitted power. Most imperfections from transmitter 20, through coaxial cable, and connectors, and antennas will be reflected back to directional coupler 444 and will alter the measurement considerably thereby providing a true and accurate measurement of RF power performance of transmitter 20.

Figure 8:
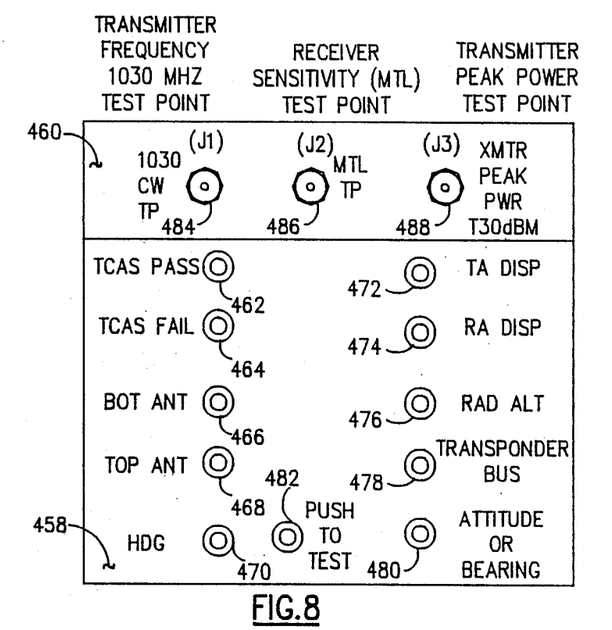
FIG. 8 is an elevation view of panel boards of the self test avionics equipment.

As shown in FIG. 8, RF section 14 has a front panel 458, and test system 16 has a corresponding front panel 460.

Panel 458 has a TCAS pass indicator 462, a TCAS fail indicator 464, a bottom antenna (BOT ANT) indicator 466, a top antenna (TOP ANT) indicator 468, and a heading (HDG) indicator 470. Panel 458 also has a TA DISP indicator 472, an RA DISP indicator 474, a RAD alt indicator 476, a transponder XPNDR BUS indicator 478, an ATT indicator 480, and a push to test switch 482.

Panel 460 has a (J1) 1030 CW TP test point connector 484, a (J2) MTL TP test point connector 486, and a (J3) XMTR PWR +30 dBm test point connector 488. Connectors 484, 486, 488 are panel mount, RF connectors.

In operation, to determine the Minimum Threshold Level (MLT) of a receiver during the self test mode of the Traffic Collision Avoidance System Computer Unit (TCAS CU) or assembly 10, a radio frequency (RF) signal is coupled to individual receivers and determined after the log amplifier whether the data contained in the RF message is correct. Reference is made to FIG. 6. The local oscillator 30 (OSC1) is the fundamental RF source necessary for transmitter 20 although a small amount of this energy, typically 1 to 3 dB, is coupled to self test circuit via directional coupler 102 (DIR 4). Modulator 110 (PS2) is an RF pin switch that is pulse modulated by a digital signal to terminal 116 controlled by the main computer (not shown). This pulsed RF message is attenuated by one of two selectable resistors in unit 120 that regulate the actual RF level being fed to the receivers in the self test mode. When the push to test switch 436 is depressed, the pin switch 400 (PS1) is switched to attenuate the feedback RF to the self test circuit to test at the Minimum Threshold Level (MTL) required per the specification standard. When switch 436 (S1) is not depressed the feedback RF power level is only such to indicate a functioning receiver and log amplifier circuit. Typically, this level is approximately −50 dBm.

Since the traffic collision avoidance system computer unit (TCAS CU) transmits RF at 1030 MHZ and receives RF at 1090 MHZ, the additional circuit is provided. Mixer 124 (MIX 1) mixes the 1030 MHZ modulated RF with an enabled 60 MHZ oscillator source 138 to produce an intermediate frequency (I) of 1090 MHZ.

The directional coupler 396 (DIR 1) monitors this self test RF feedback power, thereby providing a verification that the RF level used for self test is correct. If the TCAS CU or assembly 10 failed to function when switch 436 (S1) is depressed and a measurement of the power level of front panel connector 486 (J2) was −72 dBm, then one can say that the MTL of a receiver was not at least −72 dBm.

To enable one to verify the fundamental frequency accurately, directional coupler 398 (DIR 2) and connector 484 (J1) must be added. The Local Oscillator 30 (OSC 1) is available via the two-way divider 92 (DIV 1) or splitter. This splitter 92 provides independent matched sources for the transmitter section and Bearing Electronic Unit (BEU) which is actually the RF Receivers. This provides a Continuous Wave source of low level power to ensure that actual transmitted frequency is 1030 MHZ.

FIG. 7 shows how transmitted Peak Power can be measured reliably without removing antennas from aircraft. The circuit necessary is simply a directional coupler 442 (DIR 3) and a connector 454 (J3). This circuit can be utilized anywhere in the transmitter output circuit. The peak power measure at connector 454 (J3) is directly proportional to actual transmitter power level.

The advantages of assembly 10 are indicated hereafter

A. The problem of removing antennas from an aircraft for testing the avoinics equipment is avoided.

B. The problem of causing failures of antennas and related devices of the avionics equipment is minimized.

C. The total time for testing the avionics equipment is minimized.

D. The tests on the avionics equipment improves performance, accuracy and reliability of the avionics equipment.

While the invention has been described in its preferred embodiment, it is to be understood that the words which have been used are words of description rather than limitation and that charges may be made within the purview of the appended claims without departing from the true scope and spirit of the invention in its broader aspects.

The embodiments of an invention in which an exclusive property or right is claimed are defined as follows:

1. A self test avionics equipment comprising:

a radio frequency section; and a test system;

said radio frequency section having an input/output unit and a transmitter unit and a receiver unit, the transmitter unit and the receiver unit being connected to the input/output unit;

said input/output unit having a switch matrix component and a built-in self test component and an antenna coupler component and a master oscillator, the antenna coupler component being connected to the switch matrix component;

said transmitter unit having modulator amplifier means and having a spectrum filter and having a harmonic filter, the modulator amplifier means being connected through the self test component to the master oscillator, the spectrum filter being connected to the modulator amplifier means, the harmonic filter being connected to the spectrum filter;

said harmonic filter having an output coupling connector being connected to the switch matrix component;

said self test component having a directional coupler with an input connector being connected to the master oscillator and having a two-way divider with an input connector being connected to a first output terminal of the directional coupler;

said self test component having a modulator with an input connector being connected to a second output terminal of the directional coupler;

said two-way divider having an output coupling connector being connected to the receiver unit;

said self test component having a mixer with a first input connector from a self test oscillator;

said mixer having an output coupling connector being connected to the antenna coupler component;

said modulator having a variable attenuator being connected to an output connector of the modulator;

said attenuator having an output pin switch connector;

said test system having a first directional coupler circuit coupled to the output coupling connector from the mixer;

said test system having a second directional coupler circuit coupled to the output coupling connector from the two-way divider;

said test system having a third directional coupler circuit coupled to the output coupling connector from the harmonic filter; and said test system having a pin switch circuit having an input terminal connected to the pin switch connector from the attenuator and having an output terminal connected to a connector to a second input terminal of the mixer.

2. The equipment of claim 1, wherein each of the first and second and third directional coupler circuits comprises:
   a coupler element;
   a connector connected to the coupler element;
   a test point connected to the connector; and
   a ground connected to the test point.

3. The equipment of claim 1, wherein the pin switch circuit comprises:
   an input terminal connected to the attenuator;
   an output terminal connected to the mixer;
   a switch actuator having an actuator connector;
   a push to test switch connected to the actuator connector;
   a ground connector connected to the push to test switch; and
   a ground connected to the ground connector.

4. A test system for an avionics equipment RF section including an input/output unit having a local oscillator, and a directional coupler connected to an output of the local oscillator, and a two-way divider connected to the directional coupler and with an output coupling connector, and an attenuator connected to the directional coupler and with a switch pin connector, and a mixer with a first input connected to a supplementary oscillator and with a second output with a coupling connector connected to a resistive divider, and including a transmitter unit having a spectral filter connected to an input connected from a modulator amplifier portion, and a harmonic filter connected to an output connector from the spectral filter and with an output coupling connector to the input/output unit,
   said test system comprising:
   a first directional coupler circuit coupled to the output coupling connector from the mixer;
   a second directional coupler circuit coupled to the output coupling connector from the two-way divider;
   a third directional coupler circuit coupled to the output coupling connector from the harmonic filter; and
   a pin switch circuit connected to the pin switch connector from the attenuator.

* * * * *